Feb. 26, 1924.
E. E. FEARING
COMPASS SAW
Filed Feb. 23, 1922
1,485,261
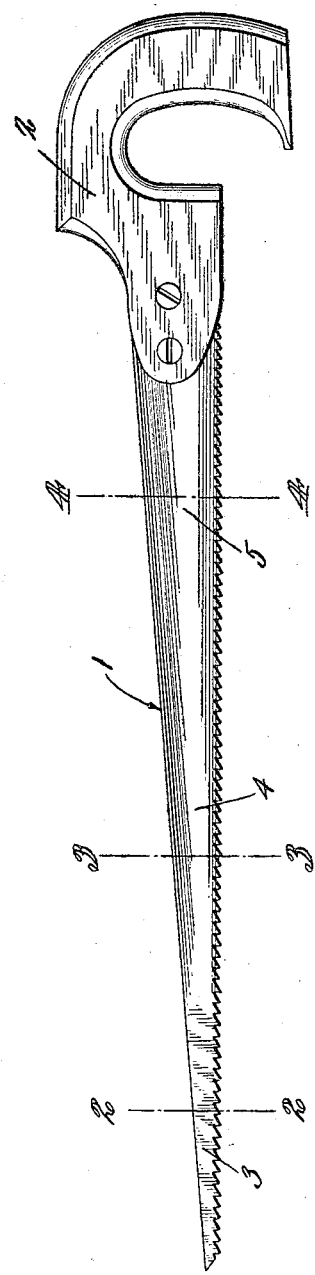
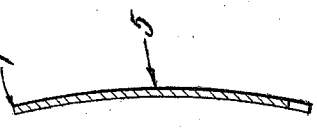
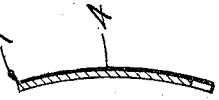
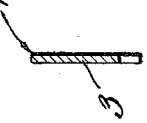
E. E. Fearing,
Inventor.
By C. A. Snow & Co.
Attorneys.

Patented Feb. 26, 1924.

1,485,261

UNITED STATES PATENT OFFICE.

ELMER E. FEARING, OF CHARLESTON, SOUTH CAROLINA.

COMPASS SAW.

Application filed February 23, 1922. Serial No. 538,693.

*To all whom it may concern:*

Be it known that I, ELMER E. FEARING, a citizen of the United States, residing at Charleston, in the county of Charleston and State of South Carolina, have invented a new and useful Compass Saw, of which the following is a specification.

The device forming the subject matter of this application is a compass saw, and the invention aims to provide a saw so constructed that a saw cut along a straight line may be formed, it being possible, further to form curved saw cuts on different radii.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a saw constructed in accordance with the invention; Figure 2 is a cross section on the line 2—2 of Figure 1; Figure 3 is a cross section on the line 3—3 of Figure 1; Figure 4 is a cross section on the line 4—4 of Figure 1.

The compass saw forming the subject matter of this application comprises a blade 1 and a handle 2, the handle being of any desired sort. For approximately one third of its length, beginning at the point, the blade 1 is flat, as denoted by the numeral 3. Throughout approximately the middle third of its length, the blade 1 is curved transversely, as shown at 4. Throughout that third of its length which is adjacent to the handle 2, the blade 1 is curved transversely as shown at 5, the said portion of the blade being curved upon the longer radius than is the intermediate portion of the blade.

Obviously, when the outer portion of the blade 2 is used, a straight saw cut can be fashioned without difficulty, and by using the intermediate portion of the blade, or that portion thereof which is adjacent to the handle, curved cuts of different radii may be made without difficulty.

Having thus described the invention, what is claimed is:

A compass saw adapted to be started in a hole and to work thence to and along an arc extended about the hole, the saw including a handle and a blade carried thereby, the blade having a flat portion at its free end and adapted to be used to make a substantially straight cut from the hole toward the arc, the blade being provided with a transversely curved portion disposed at the inner end of the flat portion and located otherwise than at a right angle to the flat portion, thereby enabling the operator to make an easy transition from the substantially straight cut to the arc, the location of the transversely curved portion of the blade at the inner end of the flat portion of the blade, serving to dispose the curved portion relatively near to the handle, and giving the operator an increased control over the saw whilst the transition is being made from the straight cut to the arc.

In testimony that I claim the foregoing as my own, I have hereto affixed my signature in the presence of two witnesses.

ELMER E. FEARING.

Witnesses:
R. H. CROOKS,
GEORGE T. DICK.